US011866207B2

(12) United States Patent
Psarev et al.

(10) Patent No.: US 11,866,207 B2
(45) Date of Patent: Jan. 9, 2024

(54) FLUSH MOUNT TABLETOP FOR AUTOMATIC CABLE TIE TOOL

(71) Applicant: Panduit Corp., Tinley Park, IL (US)

(72) Inventors: Kirill Psarev, Naperville, IL (US); Thuc K. Vu, Plainfield, IL (US); Scott M. Lesniak, New Lenox, IL (US); Alfred Pierce, Bolingbrook, IL (US)

(73) Assignee: Panduit Corp., Tinley Park, IL (US)

( * ) Notice: Subject to any disclaimer, the term of this patent is extended or adjusted under 35 U.S.C. 154(b) by 619 days.

(21) Appl. No.: 17/080,147

(22) Filed: Oct. 26, 2020

(65) Prior Publication Data

US 2021/0130017 A1 May 6, 2021

Related U.S. Application Data

(60) Provisional application No. 62/927,730, filed on Oct. 30, 2019.

(51) Int. Cl.
*B65B 13/02* (2006.01)
*B25H 1/02* (2006.01)
*B25H 1/00* (2006.01)

(52) U.S. Cl.
CPC .......... *B65B 13/027* (2013.01); *B25H 1/005* (2013.01); *B25H 1/02* (2013.01)

(58) Field of Classification Search
CPC ..... B65B 13/027; B65B 13/025; B65B 27/10; B25H 1/005; B25H 1/02; B25H 1/00
USPC .................................................. 248/671, 637
See application file for complete search history.

(56) References Cited

U.S. PATENT DOCUMENTS 2,401,511 A * 6/1946 Rue ........................... B67B 3/02 198/429
3,946,769 A 3/1976 Caveney et al.
3,976,108 A 8/1976 Caveney et al.
4,483,573 A * 11/1984 Keller ................. B23D 47/025 312/351
4,495,972 A 1/1985 Walker
44,980,506 2/1985 Moody et al.
(Continued)

FOREIGN PATENT DOCUMENTS

CN 108945564 A 12/2018
EP 0934220 B1 6/2004
(Continued)

OTHER PUBLICATIONS

Kingsing "Automatic Nylon Cable Tie Tying & Bundling Machine" Youtube, Dec. 23, 2018, (1 pg.), retrieved from the Internet URL https://www.youtube.com/watch?v=VooM_dzj1TQ on Mar. 31, 2021.

*Primary Examiner* — Muhammad Ijaz
(74) *Attorney, Agent, or Firm* — Christopher S. Clancy; James H. Williams; Aimee E. McVady

(57) ABSTRACT

A flush mount table-top assembly designed to mount an automatic cable tie tool to a work surface. The flush mount assembly includes an overlay plate, a tool cage, and a paddle assembly. The tool cage holds the automatic cable tie tool. The tool cage is suspended from the overlap plate by an integrated insert plate to enable the top of the automatic cable tie tool to protrude above the work surface. The paddle assembly is rotatably mounted to the insert plate. The paddle assembly activates the automatic cable tie tool. When not in use, the flush mount assembly can be configured to restore work surfaces lost due to fixture implementation.

19 Claims, 20 Drawing Sheets

(56) References Cited

U.S. PATENT DOCUMENTS

| | | | | |
|---|---|---|---|---|
| 4,640,319 | A | 2/1987 | Walker | |
| 4,790,225 | A | 12/1988 | Moody et al. | |
| 5,205,308 | A | 4/1993 | Kendall et al. | |
| 5,722,466 | A | 3/1998 | Levin et al. | |
| 5,944,063 | A | 8/1999 | Coates et al. | |
| 6,082,577 | A | 7/2000 | Coates et al. | |
| 6,112,499 | A | 9/2000 | Lyskawa et al. | |
| 6,279,620 | B1 | 8/2001 | Eason et al. | |
| 6,321,797 | B1 | 11/2001 | Smolinski et al. | |
| 6,508,281 | B1 * | 1/2003 | Wang | B23D 47/025<br>144/287 |
| 6,845,581 | B2 | 1/2005 | Doerr et al. | |
| 8,006,596 | B2 | 8/2011 | Schwaiger et al. | |
| 10,092,968 | B2 * | 10/2018 | Fulmer | B23D 45/06 |
| 2016/0155544 | A1 * | 6/2016 | Doolittle | G03B 21/145<br>29/755 |
| 2019/0106231 | A1 | 4/2019 | Schwinn et al. | |
| 2021/0130017 | A1 * | 5/2021 | Psarev | B25H 1/00 |
| 2021/0213547 | A1 * | 7/2021 | Young | B23D 45/025 |

FOREIGN PATENT DOCUMENTS

| | | | |
|---|---|---|---|
| JP | 4585806 | B2 | 11/2010 |
| JP | 4796870 | B2 | 10/2011 |
| JP | 4820634 | B2 | 11/2011 |
| JP | 4928806 | B2 | 5/2012 |

* cited by examiner

FLUSH MOUNT TABLETOP FOR AUTOMATIC CABLE TIE TOOL

CROSS REFERENCE TO RELATED APPLICATIONS

This application claims benefit to U.S. Provisional Patent Application No. 62/927,730, filed on Oct. 30, 2019, the entirety of which is hereby incorporated by reference herein.

FIELD OF THE INVENTION

The present invention relates to an automatic cable tie tool, and more particularly to a flush mount tabletop fixture for an automatic cable tie tool.

BACKGROUND OF THE INVENTION

Automatic cable tie tool systems are well known in the art. Productivity is critical when it comes to high-volume harnessing, assembly, fastening, and packaging applications using automatic cable tie tool systems. To remain competitive, manufacturers are faced with the constant struggle to increase throughput, reduce lead times, and meet customer expectations. Panduit Corp.'s PAT 4.0 Automatic Cable Tie Installation System addresses these challenges by introducing a series of features and functionality to transform wire bundling and assembly. The PAT 4.0 Automatic Cable Tie Installation System includes a bench mount feature that is activated by a foot pedal assembly while the current tool meets expectations for wire bundling, it is now desirable to provide an automatic cable tie installation system with an improved flush bench mount fixture including a hand paddle for activation.

SUMMARY OF THE INVENTION

The present invention is directed to an assembly that mounts an automatic cable tie tool flush to a work surface. The flush mount assembly includes an overlay plate, a tool cage assembly, and a paddle assembly. The overlay plate is secured to a work surface. The tool cage is suspended from the overlay plate by an integrated insert plate. The tool cage holds the automatic cable tie tool enabling the jaws of the tool to protrude above the work surface. The paddle assembly is rotatably mounted to the insert plate. The paddle assembly activates the automatic cable tie tool.

DETAILED DESCRIPTION

Figure 1:
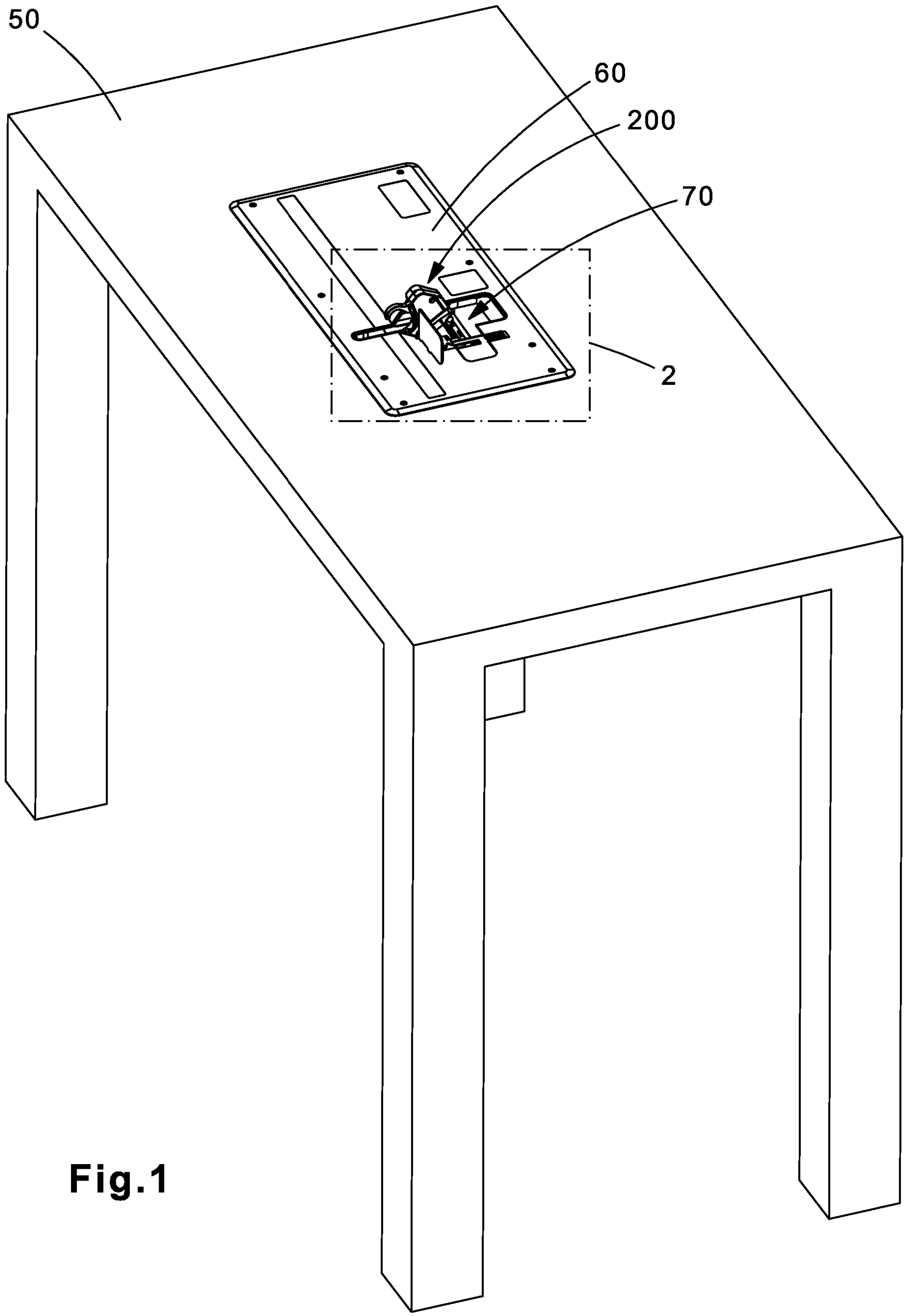
FIG. 1 is a perspective view of the flush mount tabletop fixture for an automatic cable tie tool of the claimed invention.
Figure 2:
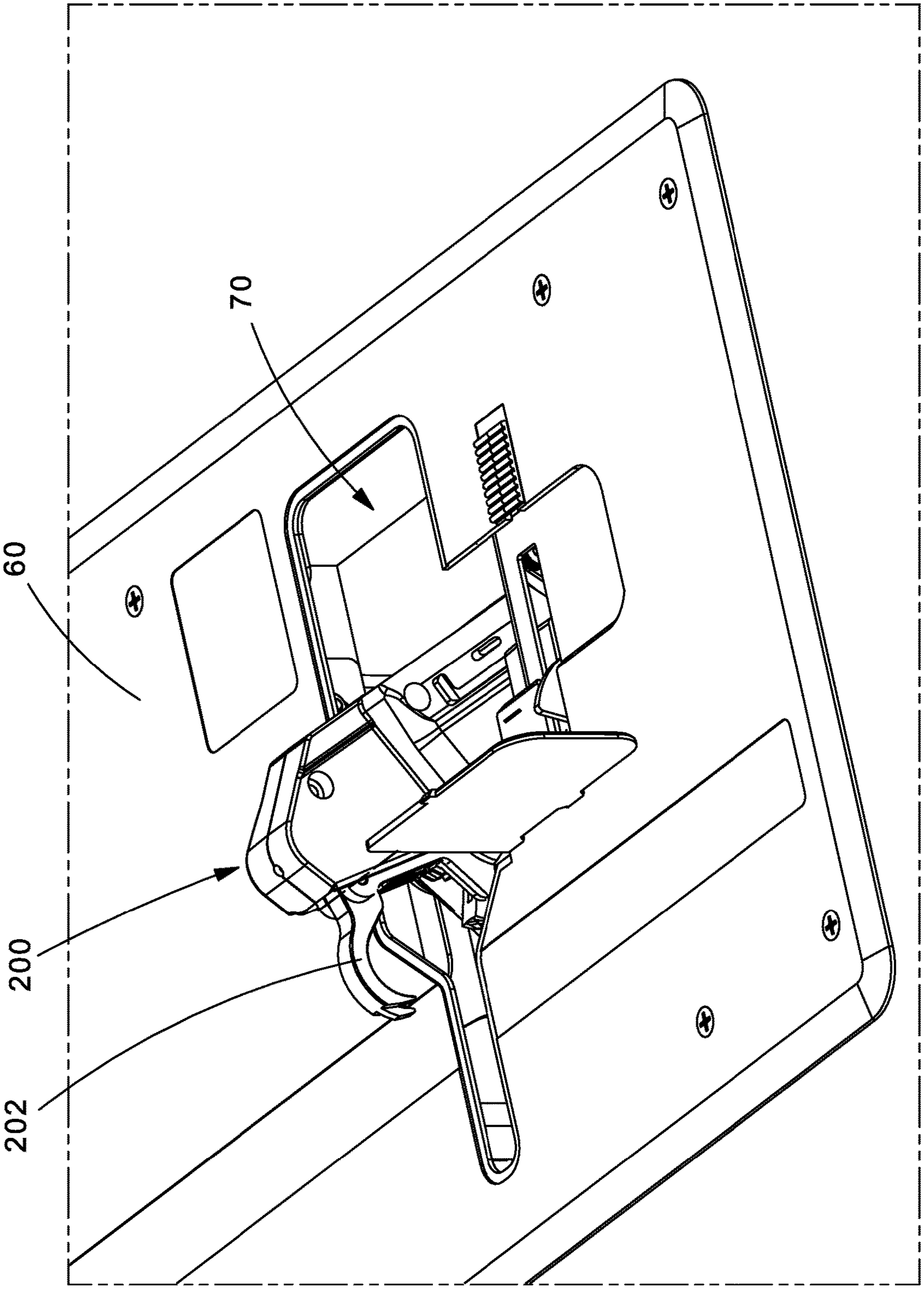
FIG. 2 is a top perspective view of the flush mount tabletop fixture and automatic cable tie tool of FIG. 1.
Figure 3:
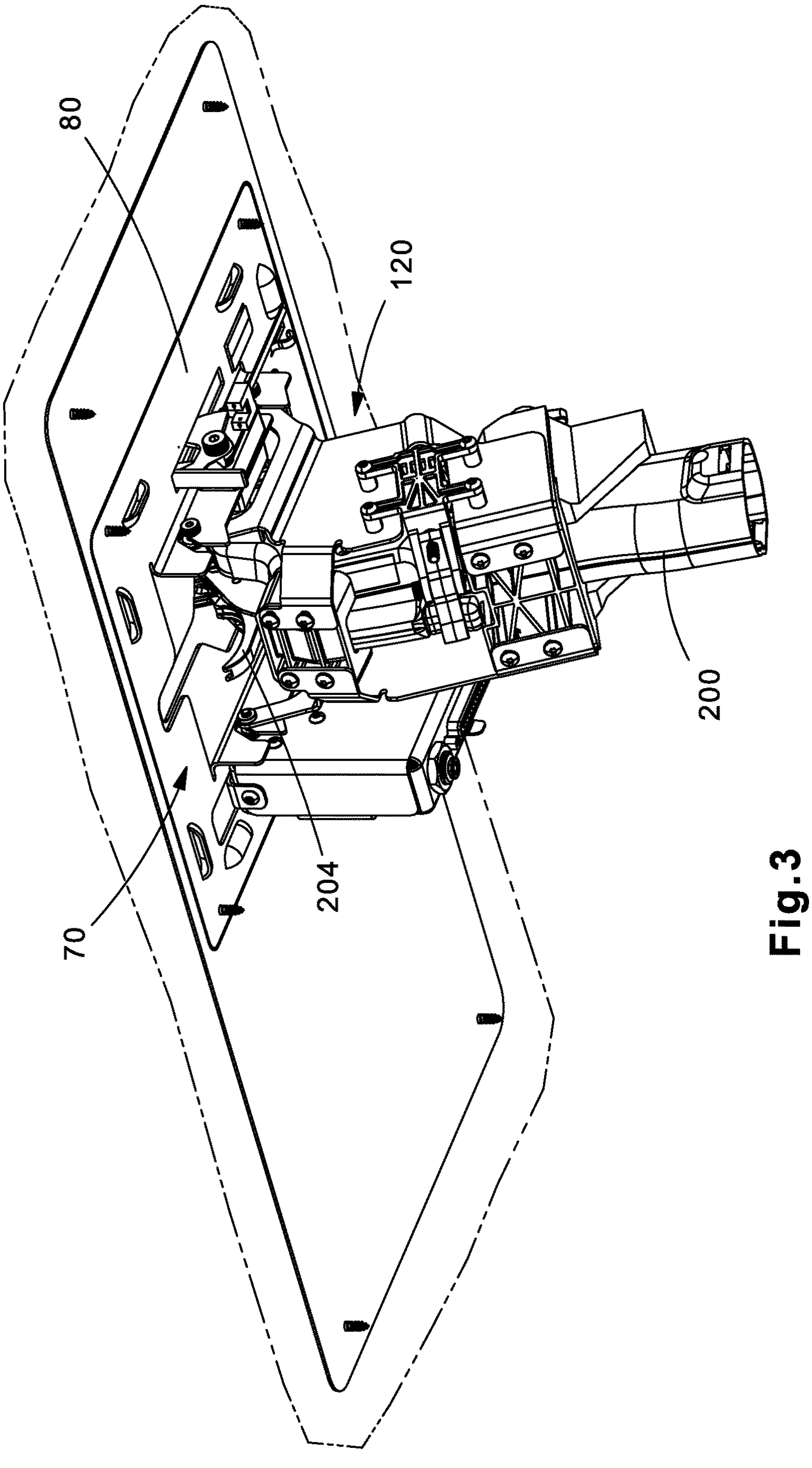
FIG. 3 is a bottom perspective view of the flush mount tabletop fixture and automatic cable tie tool of FIG. 2.

The present invention is directed to a flush mount tool fixture that suspends an automatic cable tie handheld tool 200 underneath a work surface 50. FIGS. 1-3 illustrate the flush mount tool fixture 70 of the present invention with an automatic cable tie tool 200 installed therein. The flush mount tool fixture 70 enables the top of the automatic cable tie tool 200 to protrude above a work surface 50. The automatic cable tie tool 200 is accessible for soft and ridged wire harness bundling using continuously molded cable ties. As described below, an operator actuates the tool by engaging a hand paddle 96 positioned alongside the open jaws 202, 204 of the installed automatic cable tie tool 200. The hand paddle improves the ergonomics of using the automatic cable tie tool 200 for long work durations. If desired, a ruler label may be referenced along both sides of the overlay plate for measuring distances relative to the center of the automatic cable tie tool 200.

Figure 4:
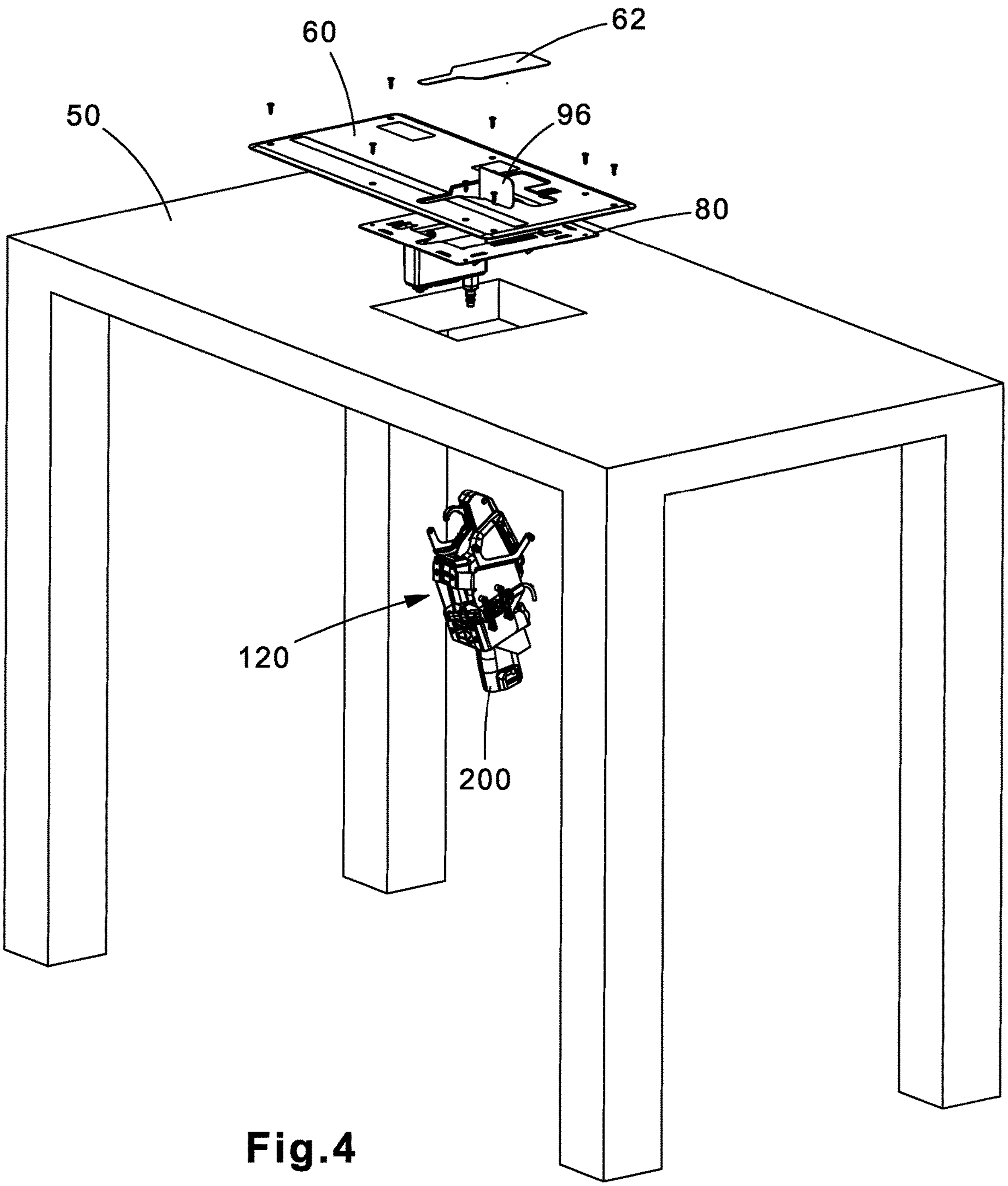
FIG. 4 is a partially exploded view of the flush mount tabletop fixture and automatic cable tie tool of FIG. 1.

The flush mount tool fixture 70 is comprised of a tool cage 120 and an overlay plate assembly. FIG. 4 illustrates a work surface 50 with an overlay plate 60, a cover 62, and an insert plate 80 positioned above the work surface 50 to be installed therein. The tool cage 120 and automatic cable tie tool 200 are positioned below the work surface 50. As discussed below, the tool cage 120 is installed onto the insert plate 80 and positioned to hold the automatic cable tie tool 200 flush with the work surface 50.

Figure 5:
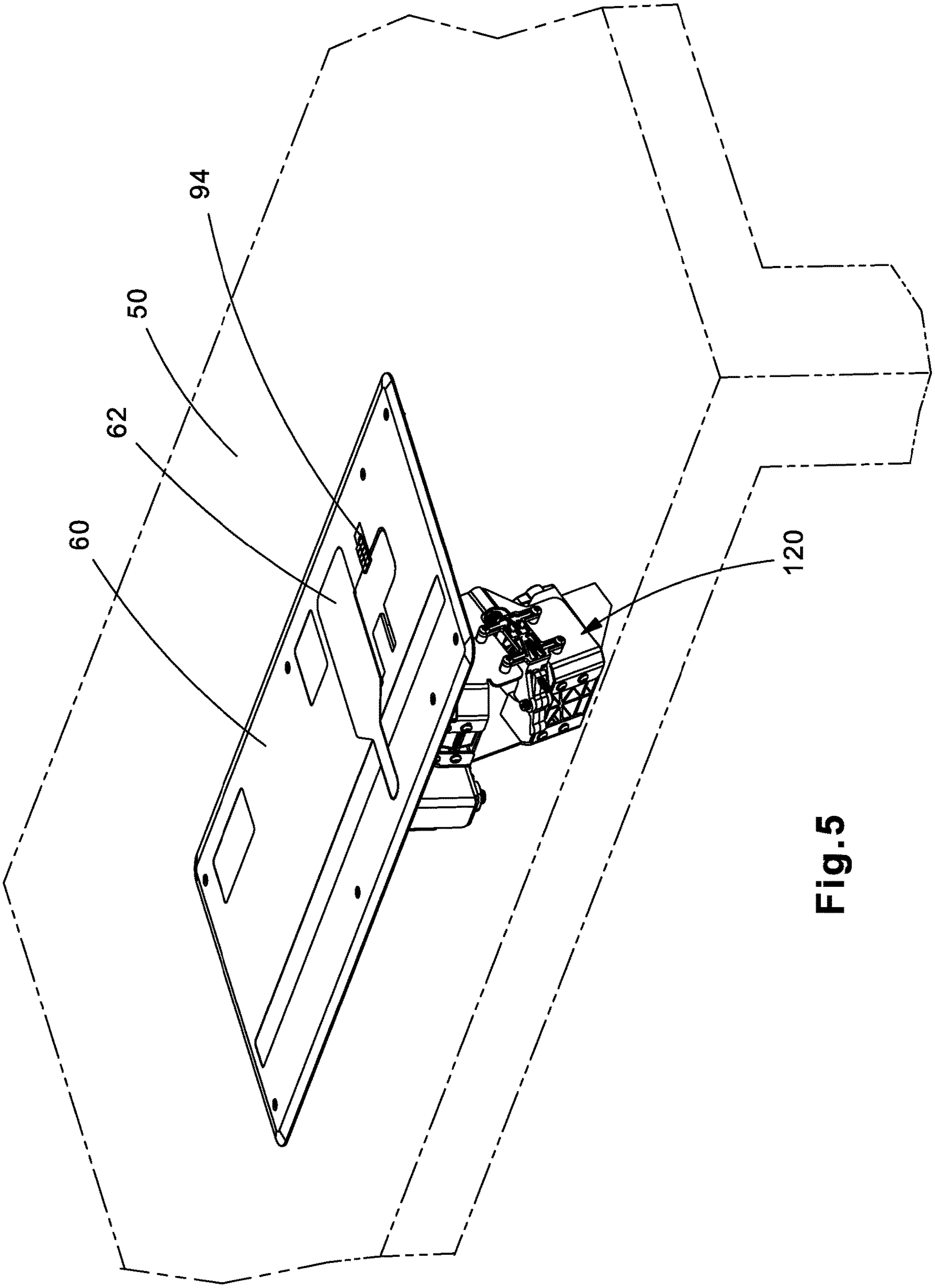
FIG. 5 is a perspective view of the flush mount tabletop fixture of FIG. 1.

FIG. 5 illustrates the assembled flush mount tool fixture with the automatic cable tie tool removed. The overlay plate 60 is affixed to the insert plate 80 (obscured from view). The overlay plate 60 provides a large work surface on the table (see FIG. 1). A smooth transition between the overlay plate and the table aims to lessen product intrusion within the work area.

When not in use, the operator removes the automatic cable tie tool 200 individually, or the tool 200 and the tool cage 120 may be removed together from the insert plate 80. As illustrated in FIG. 5, a cover 62 is installed over the open cavity. The cover 62 obscures the surface gaps in the flush mount tool fixture when the fixture is not in use. The actuation hand paddle 96 can be restrained by manually pushing the front face of the paddle until a ninety-degree arc is traveled. At this point the paddle 96 engages a latching slider 94 secured between the overlay plate 60 and the insert plate 80. The latching slider 94 locks the paddle 96 in a retracted position flush with the work surface 50. As a result, a flat work surface is created to restore the surface area used by the flush mount tool fixture 70 and the automatic cable tie tool 200.

Figure 6:
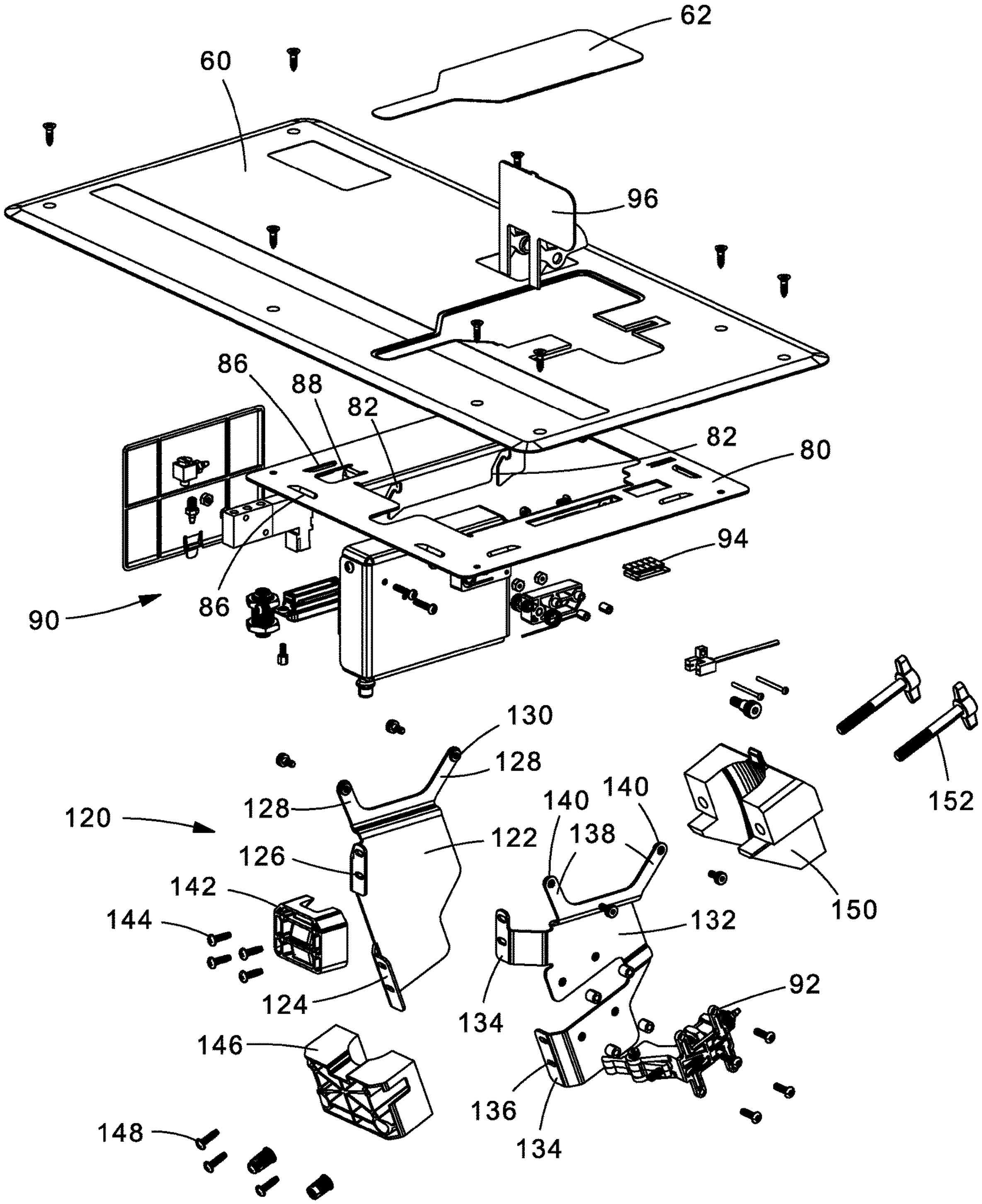
FIG. 6 is an exploded view of the flush mount tabletop fixture of FIG. 5.

FIG. 6 is an exploded view of the flush mount tool fixture of the present invention. The tool cage 120 is positioned below the overlay plate 60 and the insert plate 80. The tool cage 120 includes a first side cage member 122 and a second side cage member 132. Each side cage member 122, 132 includes arms 128, 138, respectively, with guide bolts 130, 140 located at the distal ends of the arms 128, 138. The first side cage member 122 and second side cage member 132 also include front flanges 124, 134 with apertures 126, 136, respectively. The front flanges 124, 134 are secured to the front support block 142 and the front handle support block 146 by fasteners 144, 148 to form the front of the tool cage 120. A rear handle support block 150 is secured to the front handle support block 142 by rear block retaining thumb screws 152. The front support block 142, the front handle support block 146, and the rear handle support block 150 retain the automatic cable tie tool 200 in its desired position.

The guide bolts 130, 140 at the distal ends of the arms 128, 138 of the first side cage member 122 and second side cage member 132 interact with guide slots 82 in the insert plate 80. The guide slots 82 guide the first side cage member 122 and the second side cage member 132 of the tool cage 120 into a position effectively fixing the tool cage 120 in place relative to the work surface 50. No mechanical fastener is required to affix the tool cage 120 to the insert plate 80. Alignment end stops 84 (see FIG. 8) assist in aligning the tool cage 120 for insertion by limiting forward travel once the guide bolts 130, 140 align with the insert plate guide slots 82.

The insert plate 80 retains the actuator 92, the tool cage 120, and the electronics enclosure 90. The insert plate 80 also includes a plurality of locating louvers 86 (see FIG. 6). The locating louvers 86 help align the insert plate 80 during installation onto a work surface 50.

The electronics enclosure 90 is fastened to flanges 88 on the insert plate 80. The electronics enclosure 90 houses the electronic pneumatic valve as well as the PCB required to relay optical limit switch signals to the system via a parallel port. A standard NPT male quick connect fitting accepts air at forty (40) PSI from the primary airline leading to the PAT system. That air is channeled into the electronic valve and exits through a ⅜" quick connector. A grommet covers a slotted path for external sensor conductors to enter the electronics enclosure 90 and provide feedback on the position of the paddle 96.

A linear actuator 92 is mounted onto the second side cage member 132. The linear actuator 92 is fed air from the ⅜" quick connector. A pneumatic cylinder receives this air thus pivoting the actuator arm which strikes the PAT tool's trigger, engaging the jaws and allowing the PAT system to feed the cable tie onto a work piece, such as a cable bundle. An internal spring retracts the actuator arm once air pressure is removed from the air line by the valve.

Figure 7:
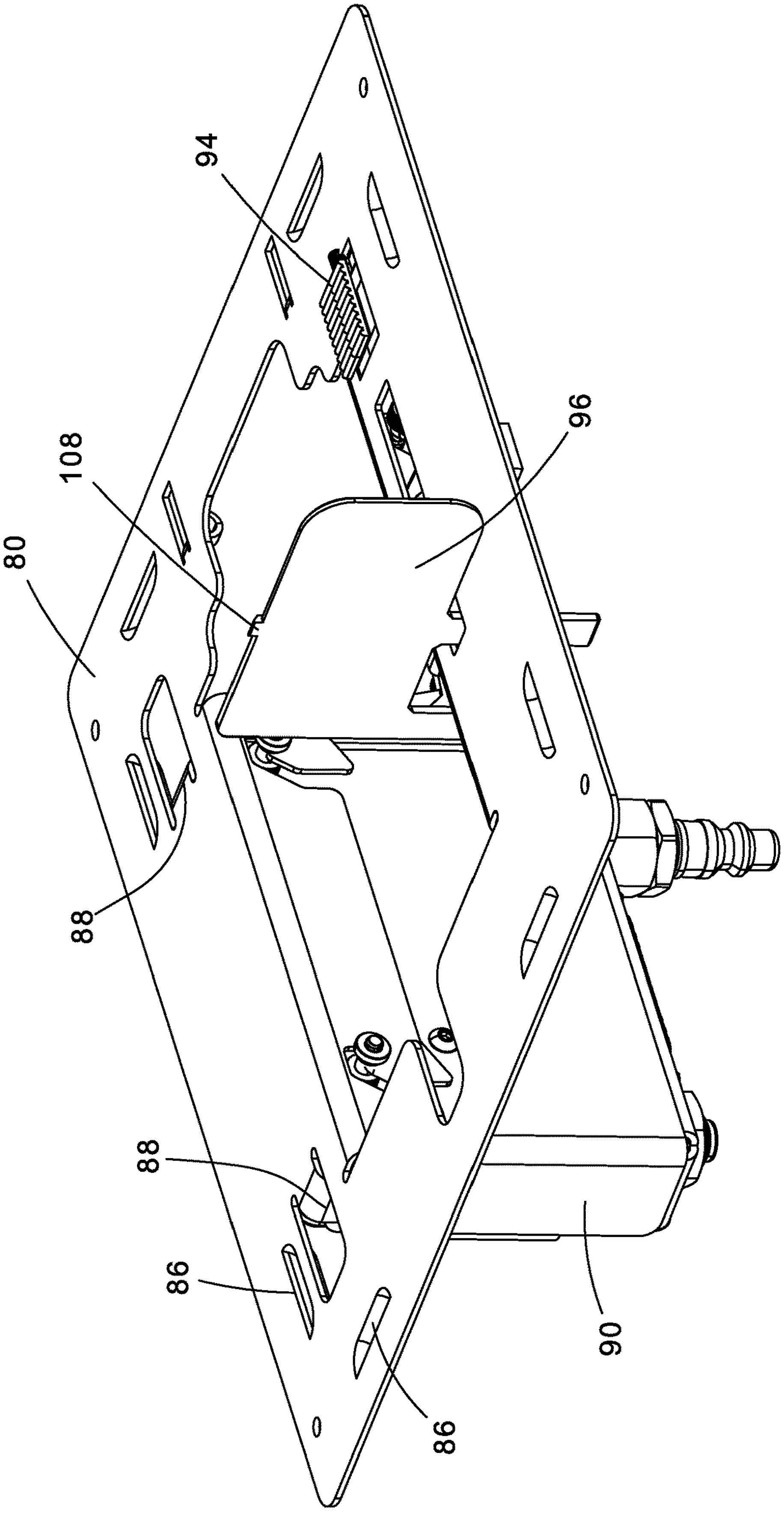
FIG. 7 is a perspective view of the insert plate of the flush mount tabletop of FIG. 5.
Figure 8:
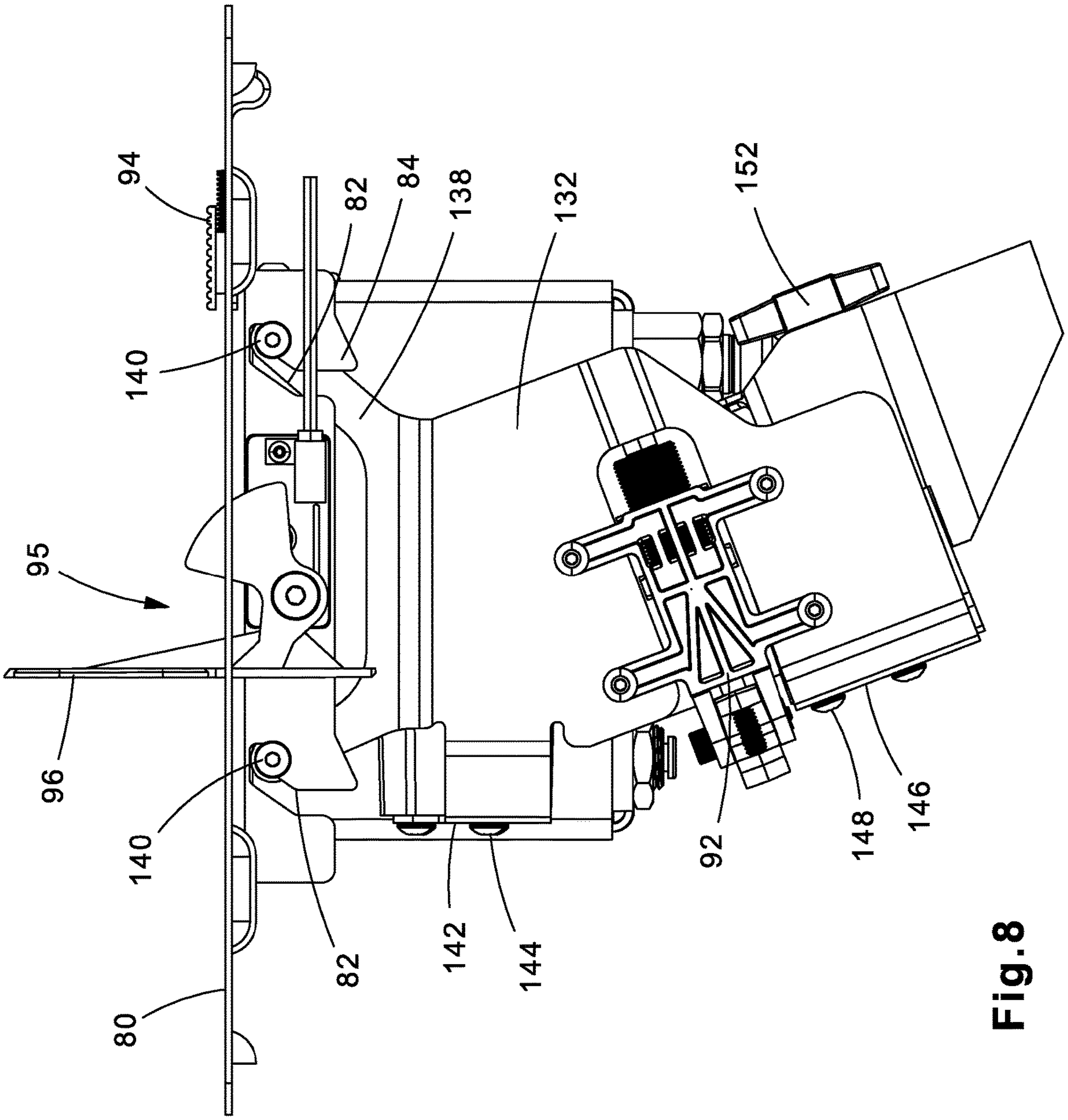
FIG. 8 is a side view of the insert plate of FIG. 7 with the tool cage attached thereto.
Figure 9:
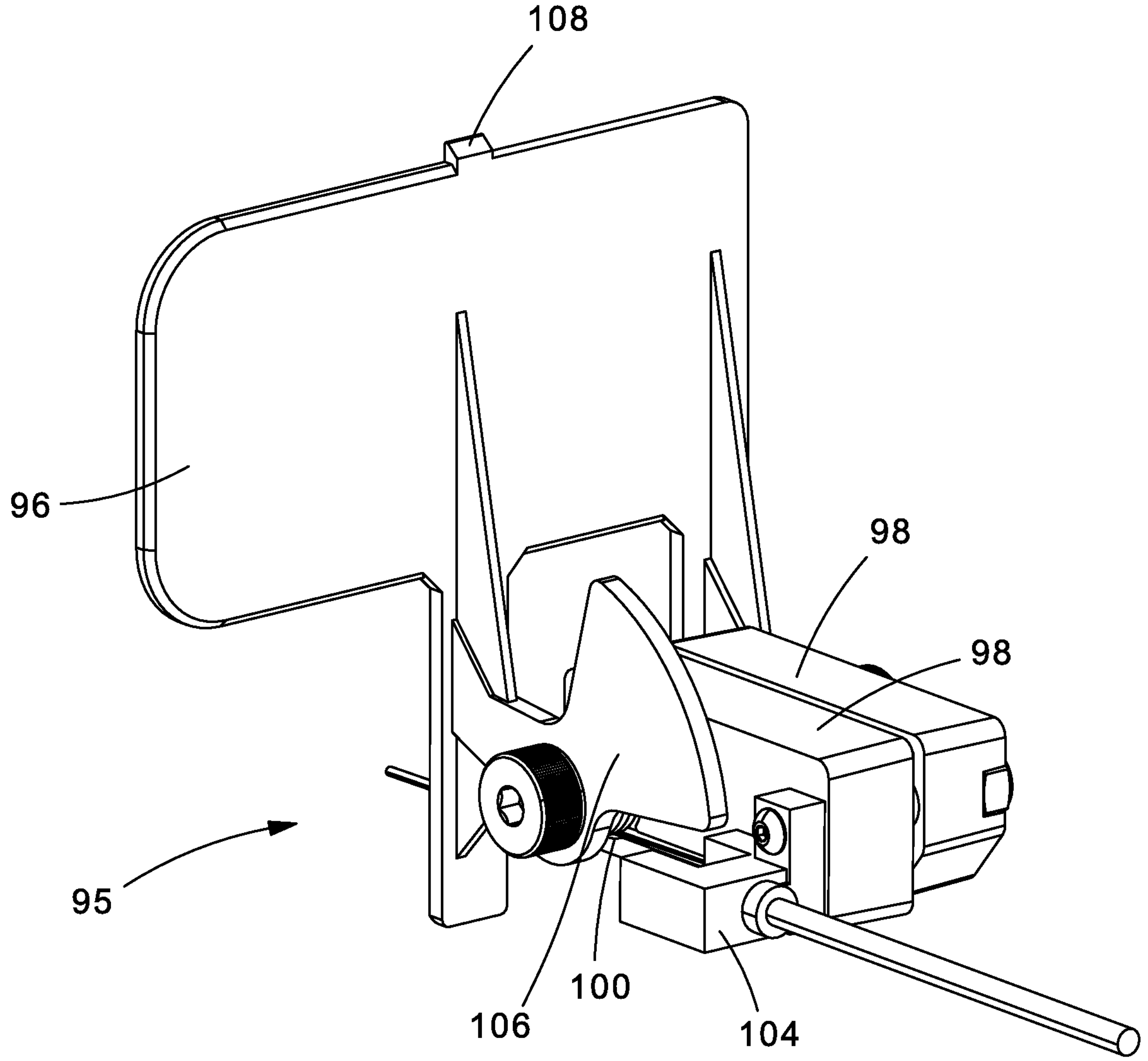
FIG. 9 is a rear perspective view of the paddle assembly that is installed onto the insert plate of FIG. 7.
Figure 10:
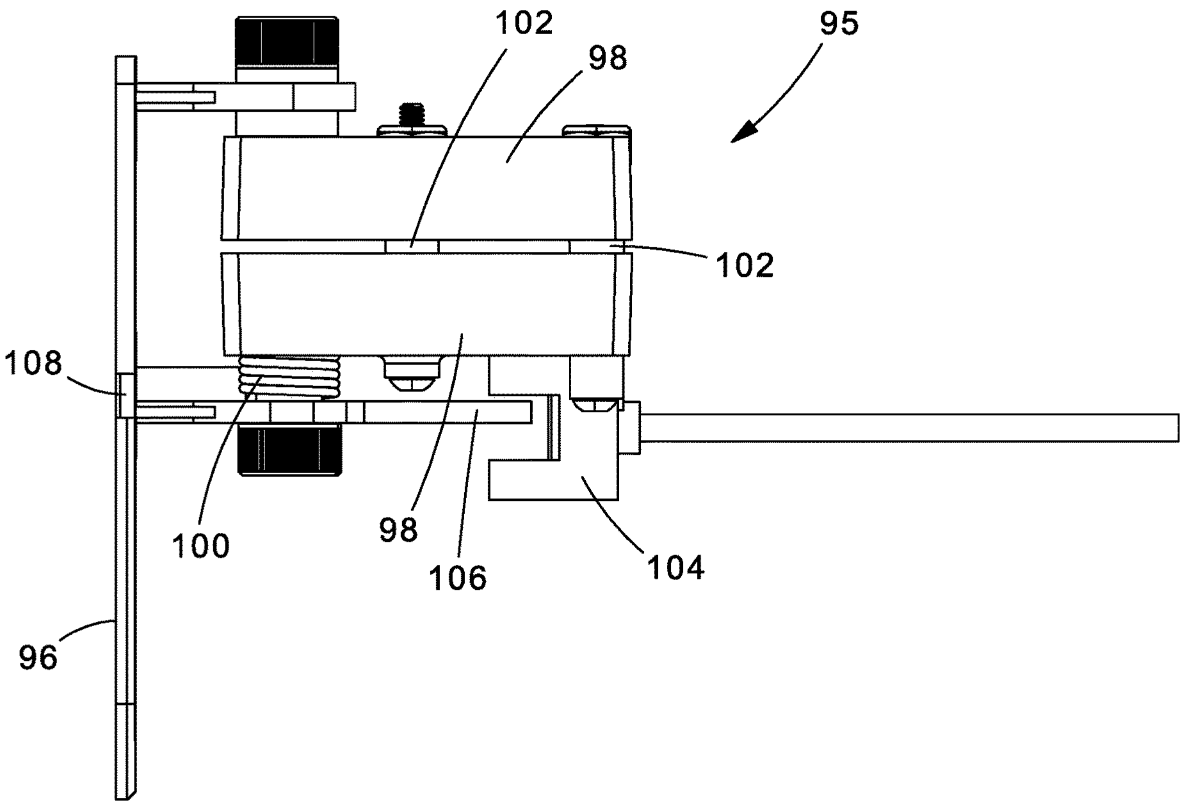
FIG. 10 is a top view of the paddle assembly of FIG. 9.

FIG. 7 illustrates the insert plate 80 and actuation hand paddle 96 in an upright position. FIG. 8 illustrates the tool cage 120 secured to the insert plate 80 and the actuation hand paddle 96 in the upright position.

FIGS. 9-12 further illustrate the actuation hand paddle assembly. The paddle assembly 95 includes a paddle 96 which is mechanically fastened to a pair of mounting blocks 98. The paddle 96 is actuated by either an operator's hand or by the workpiece and returns to its start position via a torsion spring 100. The mounting blocks 98 straddle a slot on the right-hand side flange of the insert plate 80. Two nylon bushings 102 fit within the opening of the slot and align the mounting blocks 98. The actuation sensor is an optical limit switch 104 and is fastened to the exterior mounting block 98 by the screws that retain the two blocks against the insert plate flange 88.

The paddle 96 is designed to travel throughout a full ninety-degree arc. The paddle 96 will engage the pneumatic cylinder throughout a sixty-degree arc as established by the optical sensor blade 106. The paddle 96 can travel through fifteen degrees of motion before the blade blocks the optical beam and will continue to actuate if the blade inhabits the optical sensor slot. As the paddle 96 approaches horizontal, the blade 106 will disengage from the sensor and allow the paddle 96 to be latched in a horizontal orientation via the paddle latch 108 engaging the release slider 94 on the overlay plate 60 and insert plate 80.

Figure 11:
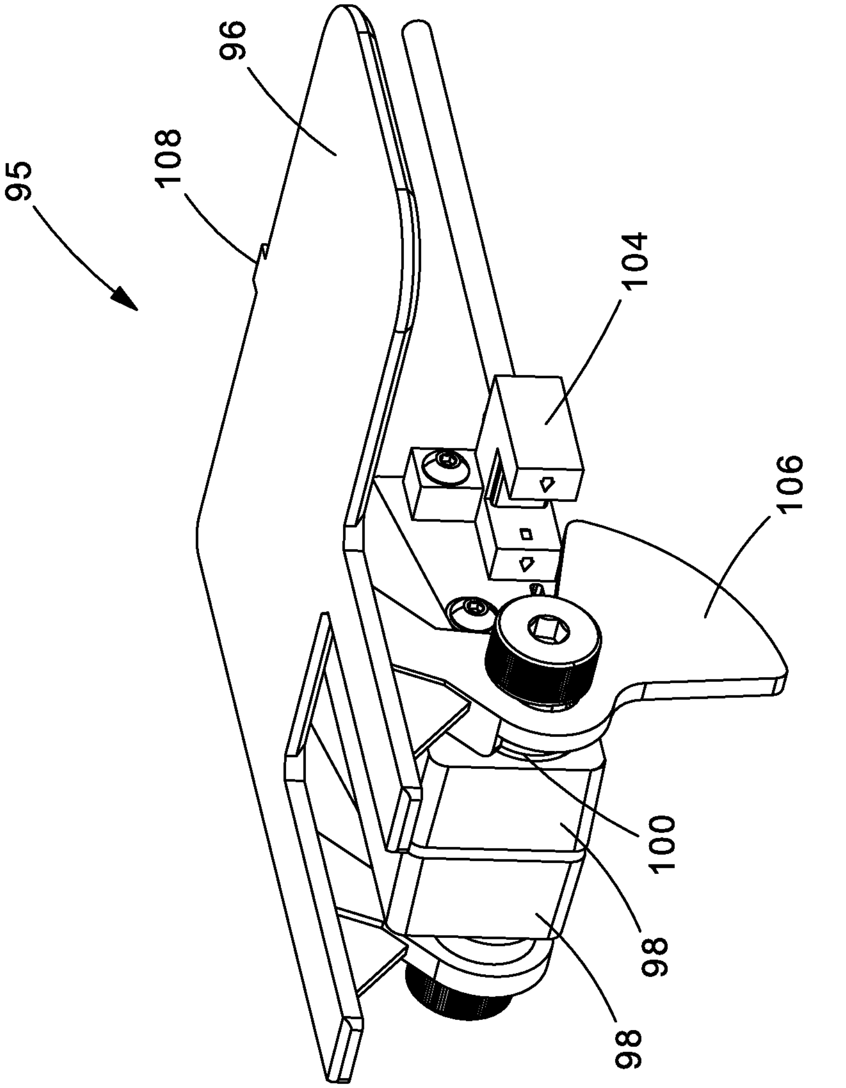
FIG. 11 is a front perspective view of the paddle assembly of FIG. 9 with the paddle in a folded position.
Figure 12:
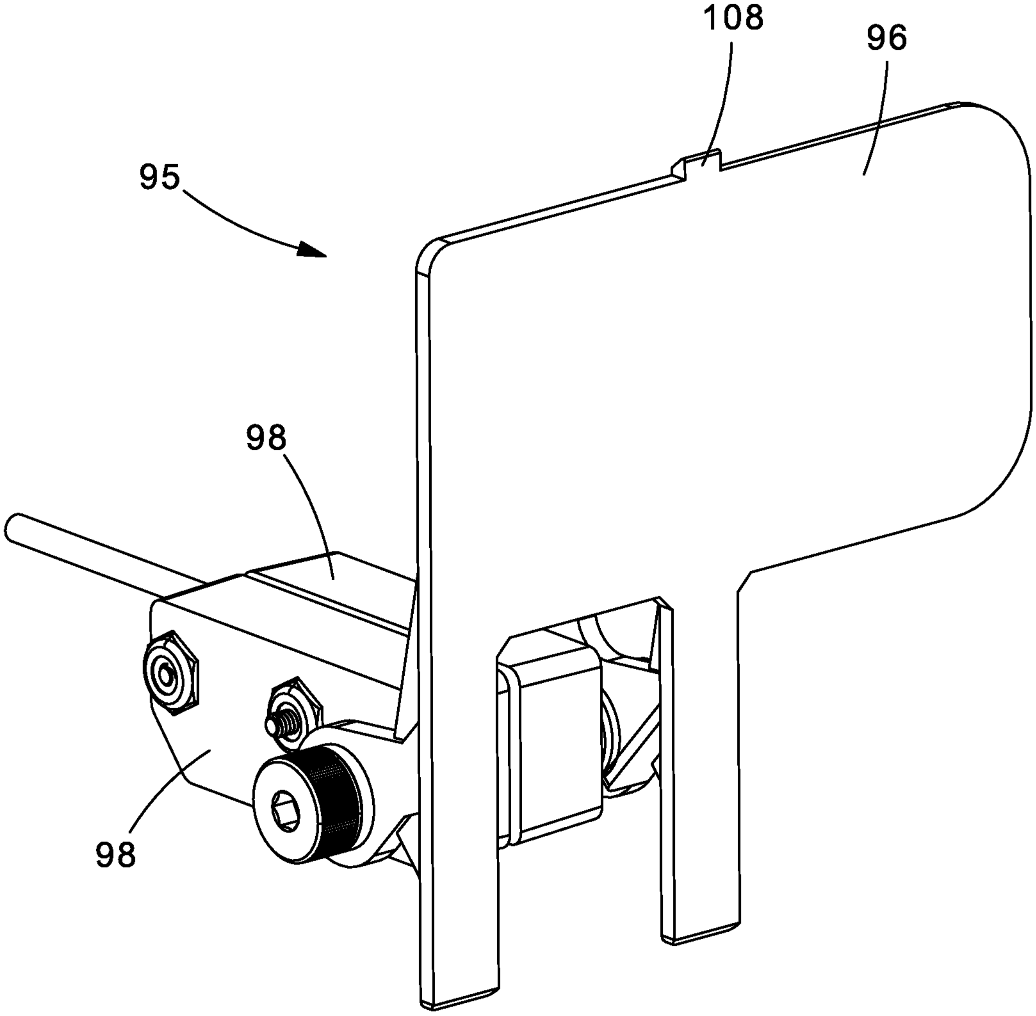
FIG. 12 is a front perspective view of the paddle assembly of FIG. 9.
Figure 13:
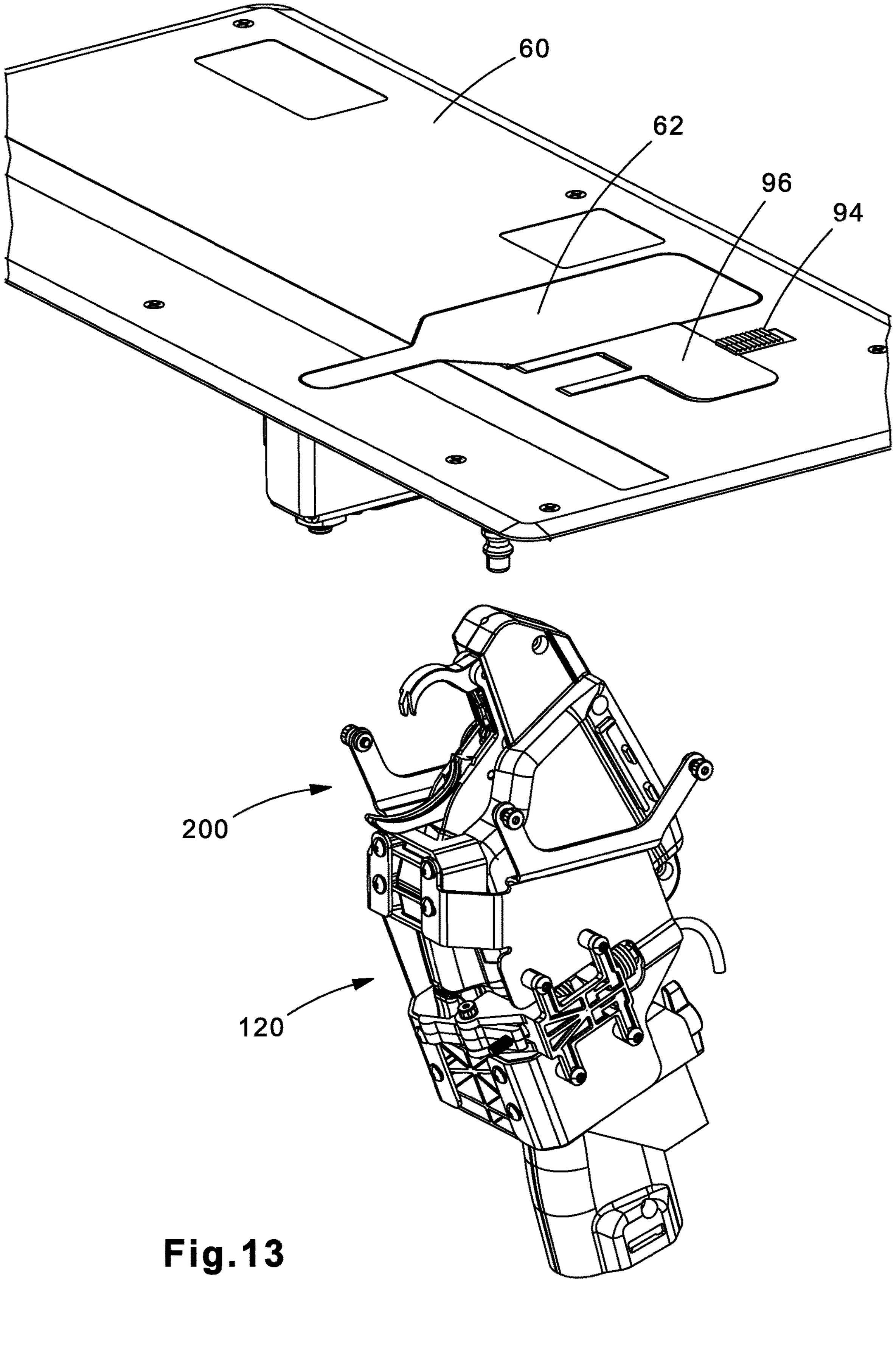
FIG. 13 is a partially exploded perspective view of the automatic cable tie tool and tool cage, positioned to be inserted in the flush mount tabletop fixture of FIG. 5.
Figure 14:
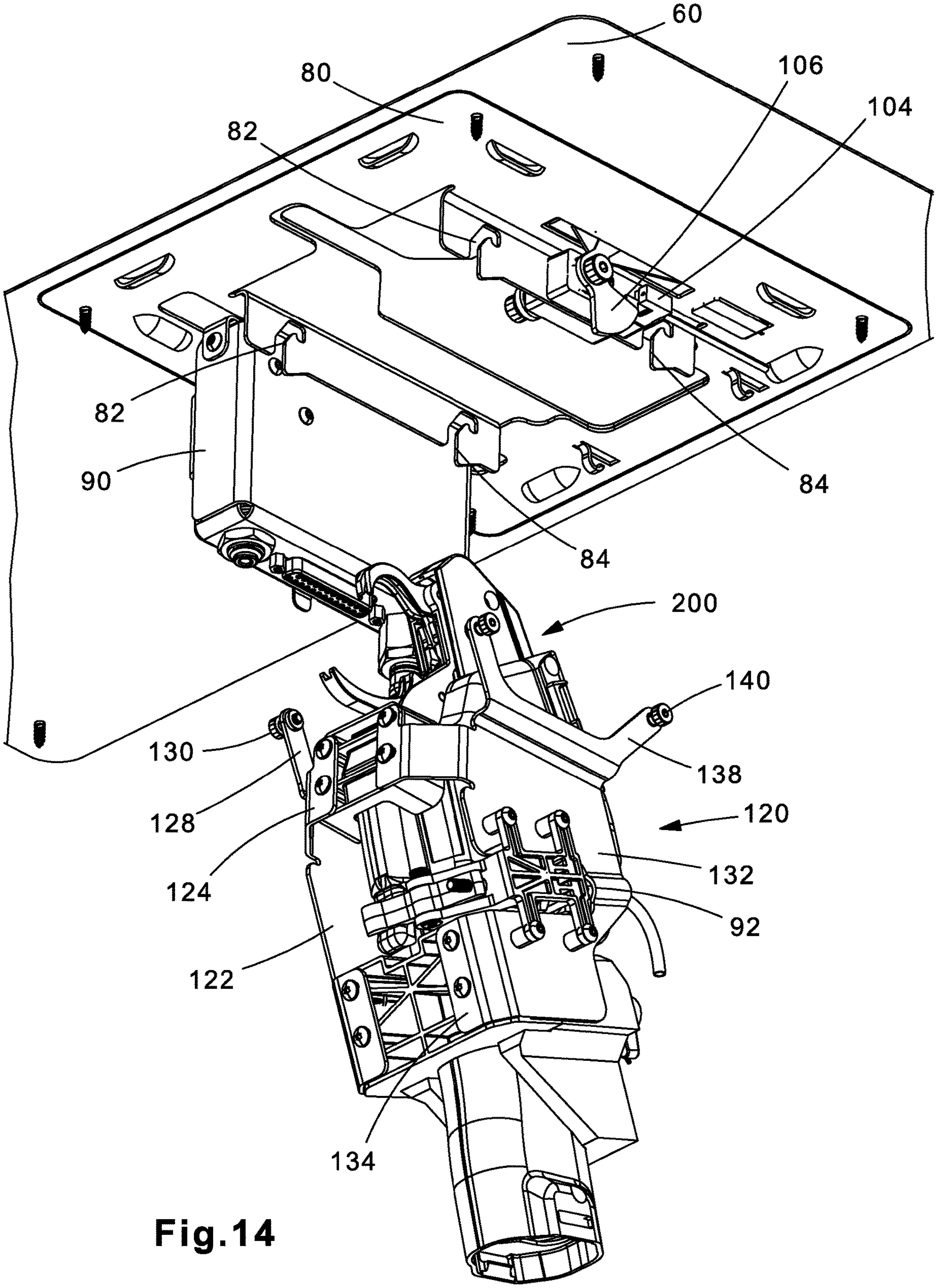
FIG. 14 is a bottom partially exploded perspective view of the automatic cable tie tool and tool cage, positioned to be inserted in the flush mount tabletop fixture of FIG. 13.

FIG. 11 illustrates the paddle assembly 95 with the paddle 96 in the horizontal orientation. Moving the release slider 94 away from the paddle 96 will disengage the paddle latch 108. Once released, the paddle 96 flips up to a vertical position, ready for operation. The forward travel as well as the actuation resistance and "reset" is accomplished by the torsion spring 100. Slots integrated within the insert plate 80 enable the paddle to cover overlay openings when in the folded, latched horizontal orientation.

Figure 15:
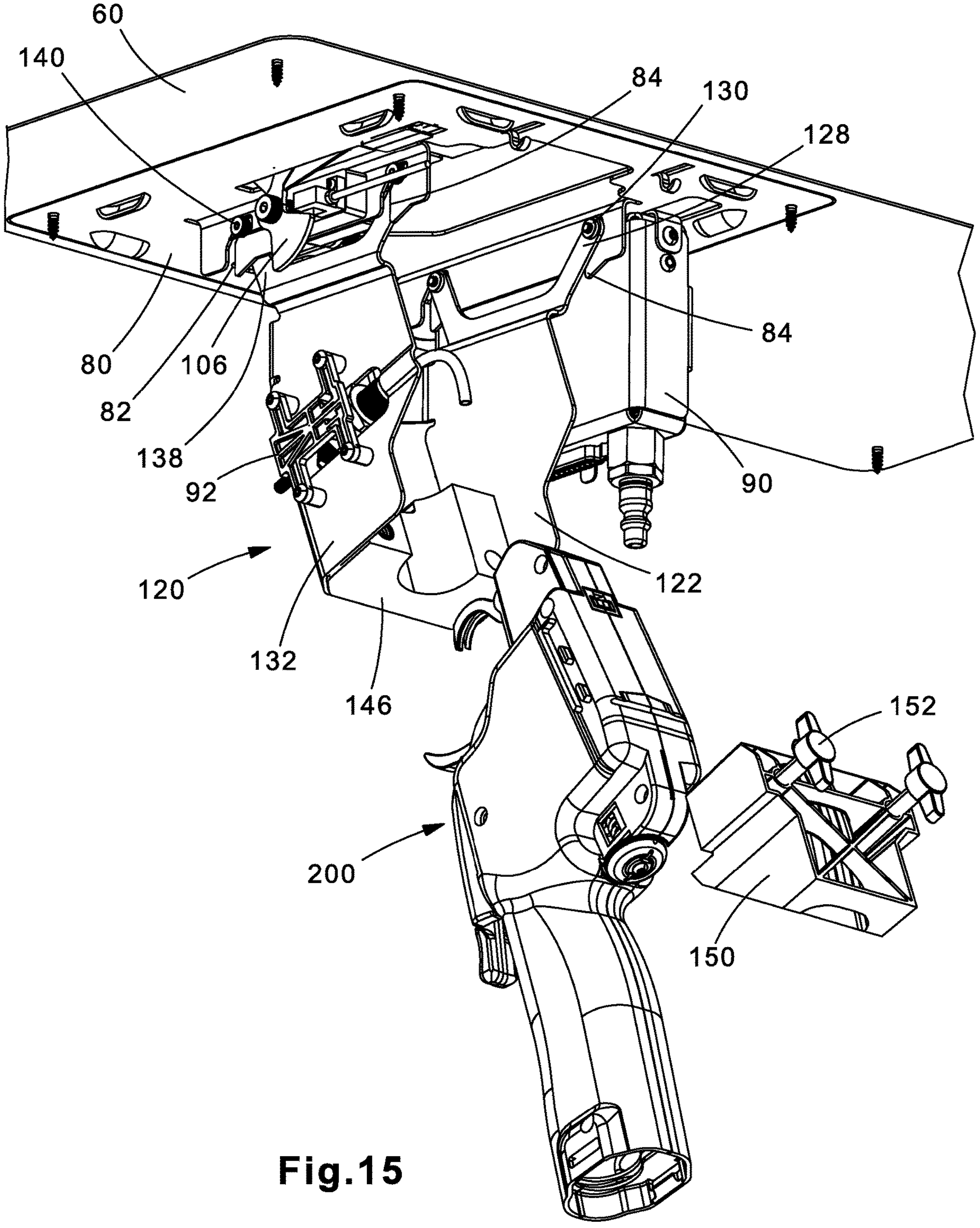
FIG. 15 is a bottom partially exploded perspective view of the automatic cable tie tool, positioned to be inserted into the tool cage, mounted to the flush mount tabletop fixture of FIG. 11.

FIGS. 13-16 illustrate the flush mount tool fixture and the automatic cable tie tool 200 of the present invention prior to use. FIGS. 17-20 illustrate flush mount tool fixture and the automatic cable tie tool 200 in use. As discussed above, the tool cage 120 may be installed in the slots 82 in the insert plate 80 with the automatic cable tie tool 200 (FIGS. 13-14) or the tool cage 120 may be installed onto the slots 82 in the insert plate 80 individually (FIG. 15). If the tool cage 120 is installed individually, the automatic cable tie tool 200 and rear handle support block 150 are secured to the tool cage 120 after it is mounted to the insert plate 80. Additionally, the cover 62 is removed from the overlay plate 60 prior to installing the automatic cable tie tool 200.

Figure 16:
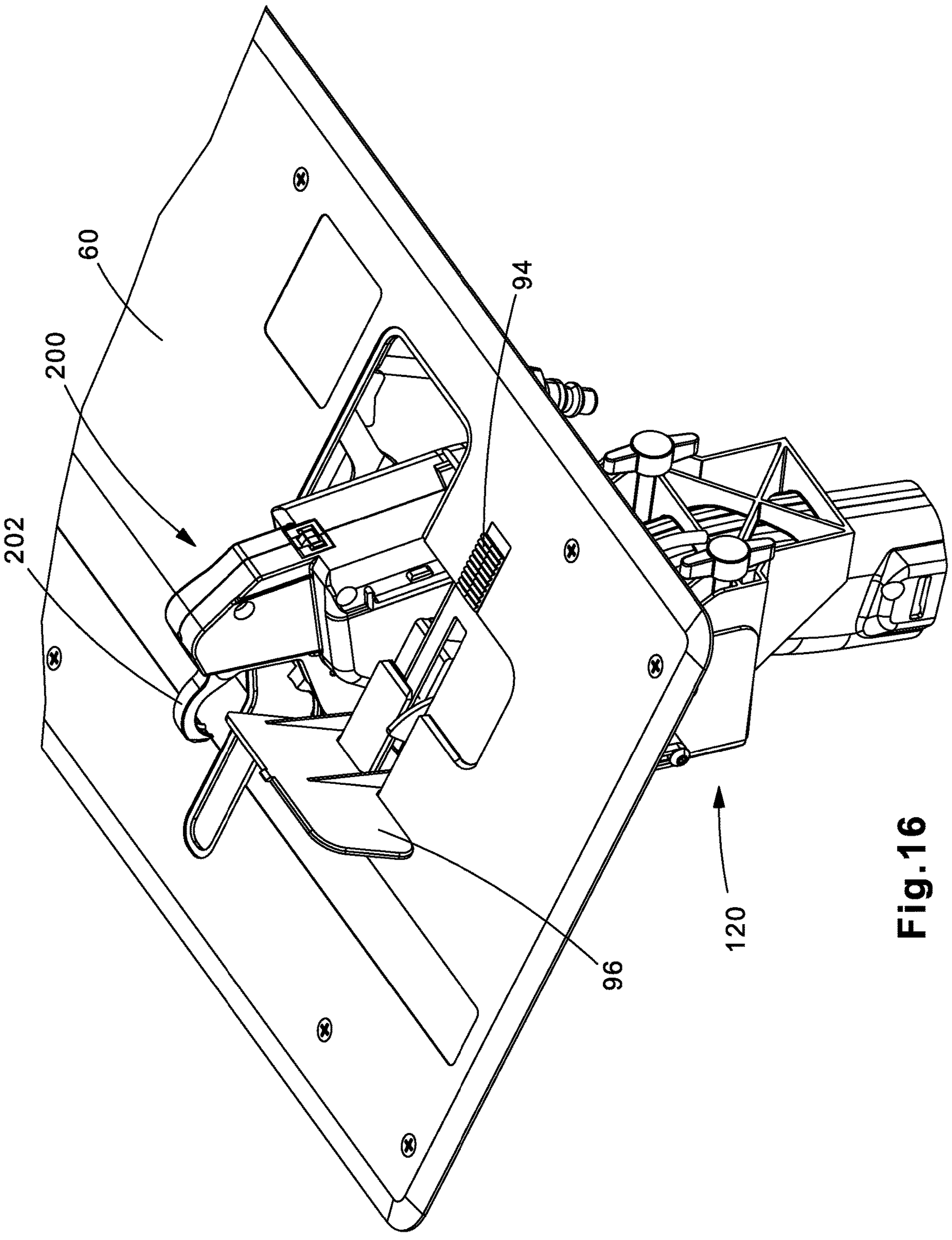
FIG. 16 is a top rear perspective view of the flush mount tabletop fixture and automatic cable tie tool of FIG. 2.

FIG. 16 illustrates the flush mount tool fixture and automatic cable tie tool 200 in an operational position ready to install cable ties. The cover 62 has been removed and the top of the automatic cable tie tool 200 extends above the overlay plate 60. The hand paddle 96 is also in an upright position, ready to be activated.

Figure 17:
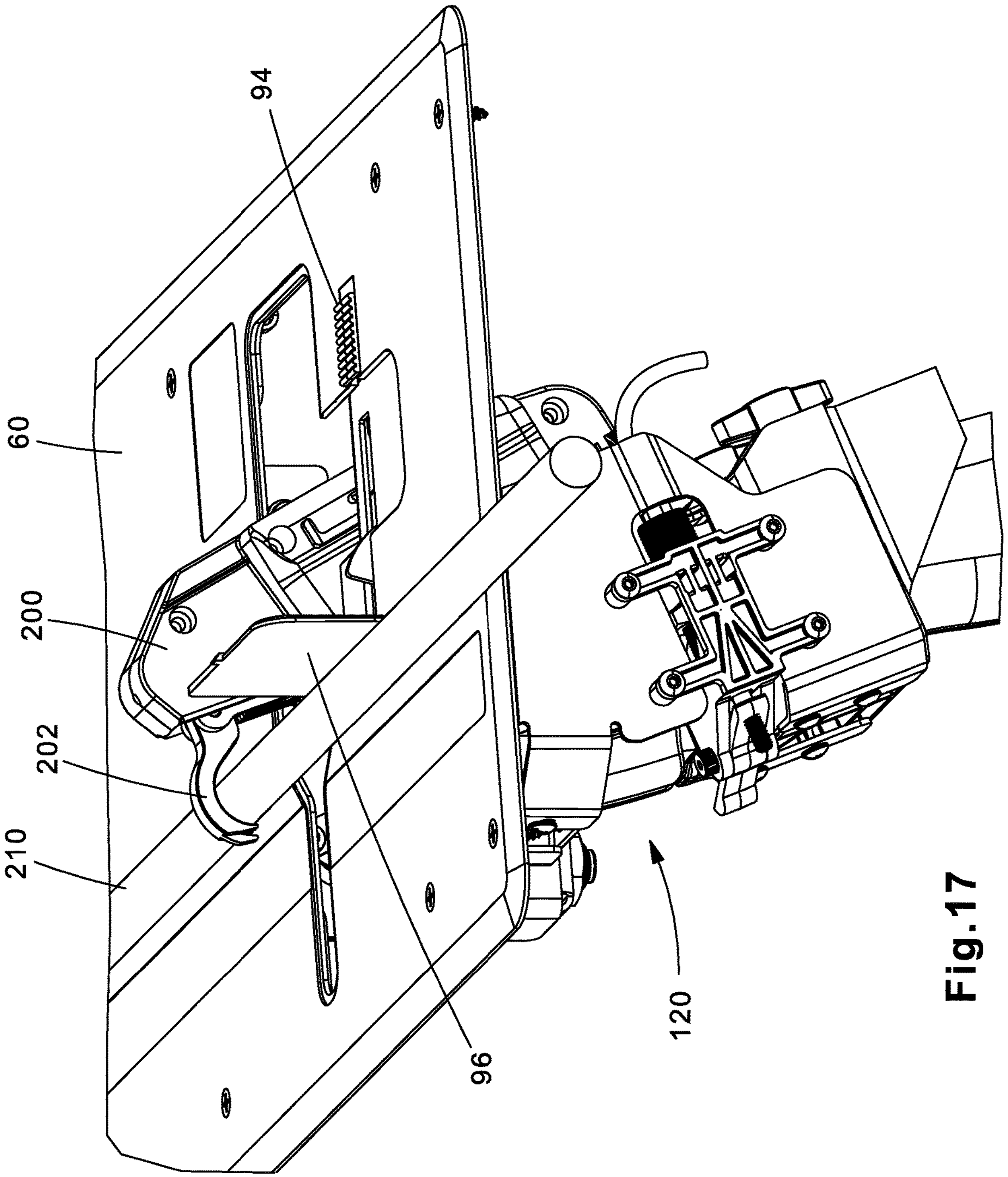
FIG. 17 is a perspective view of the flush mount tabletop fixture and automatic cable tie tool of FIG. 16, with a workpiece positioned within the tool.
Figure 18:
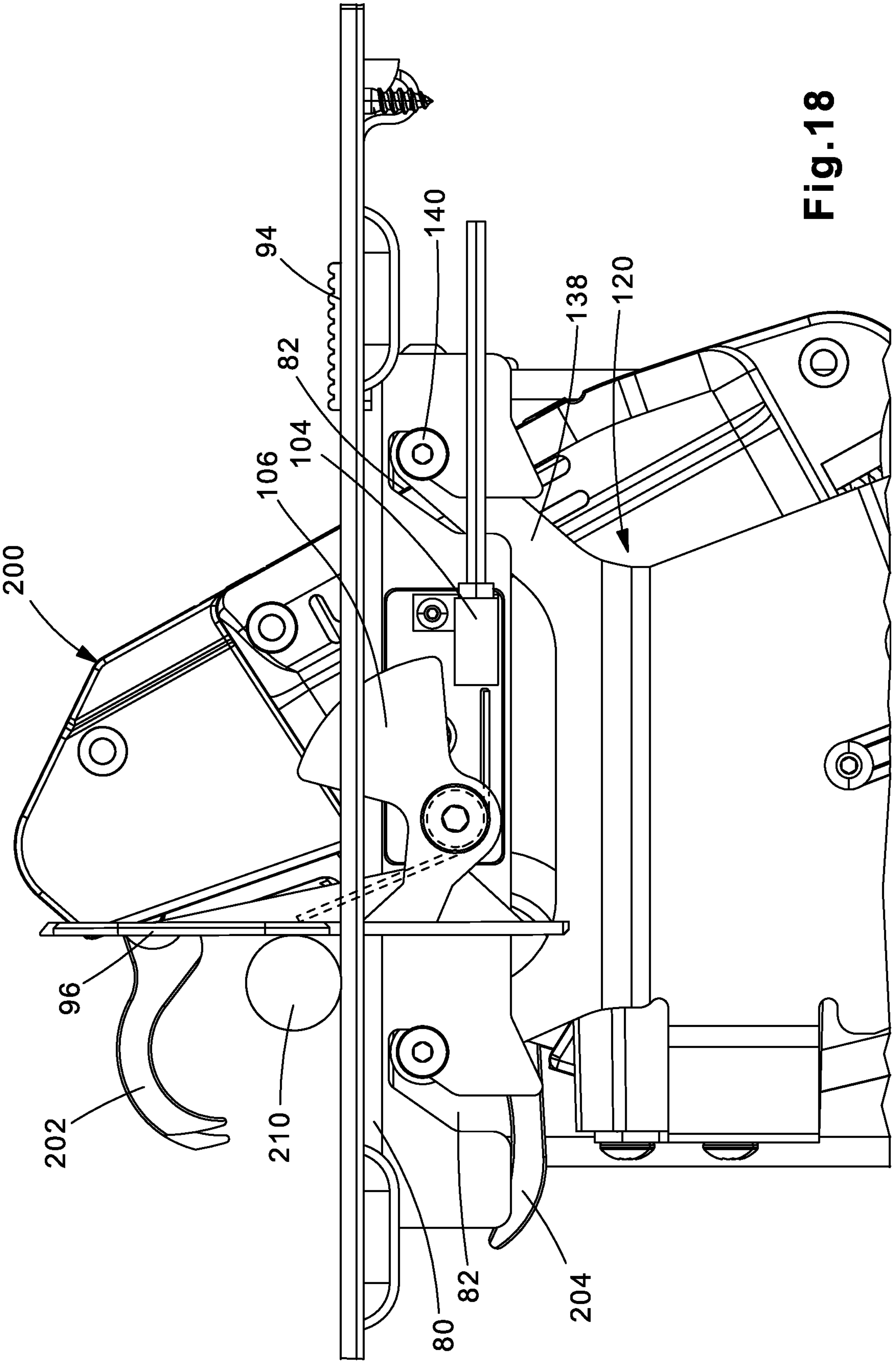
FIG. 18 is a side view of the flush mount tabletop fixture and automatic cable tie tool of FIG. 17, with a workpiece positioned within the tool.
Figure 19:
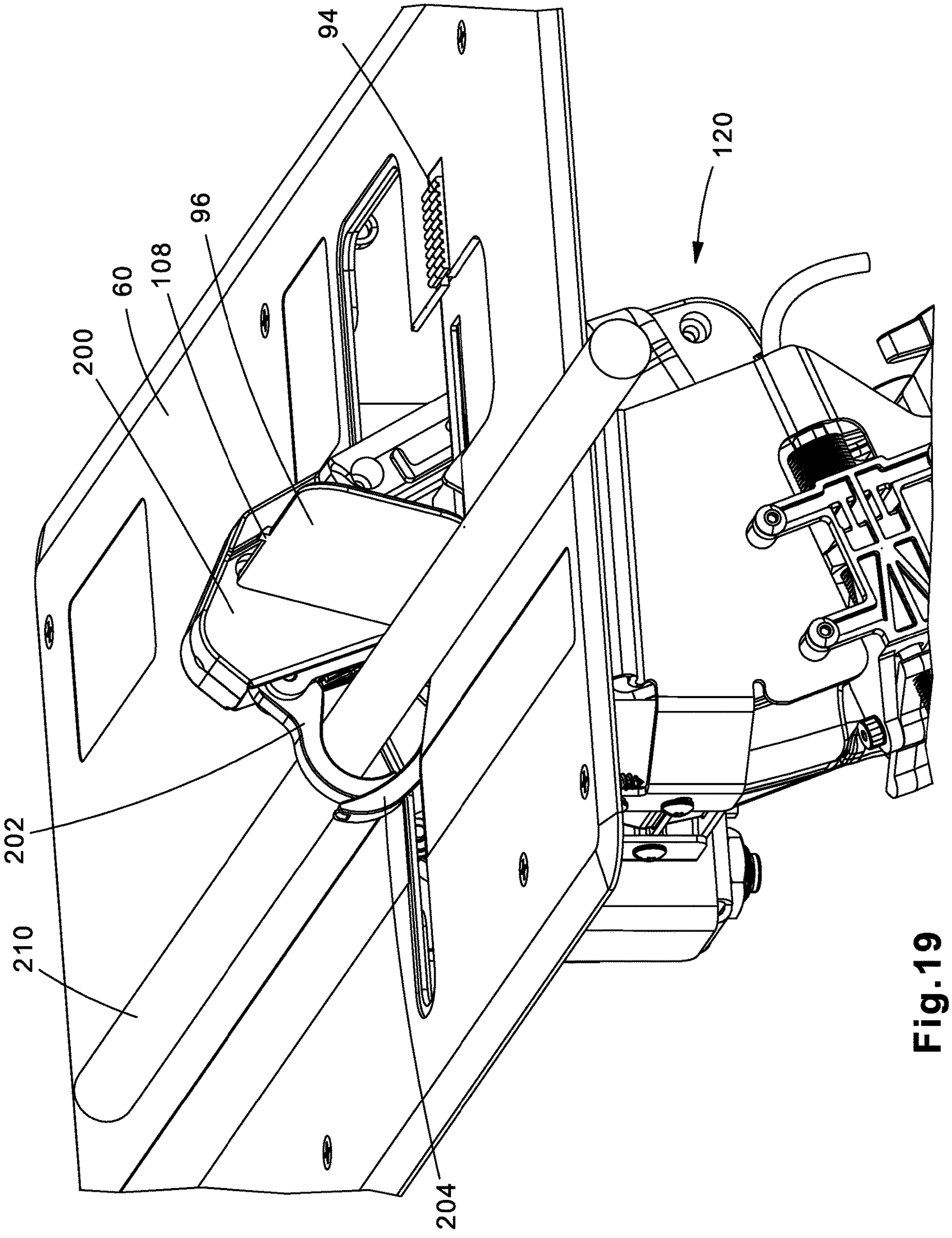
FIG. 19 is a perspective view of the flush mount tabletop fixture and automatic cable tie tool, with the jaws of the tool around a workpiece.
Figure 20:
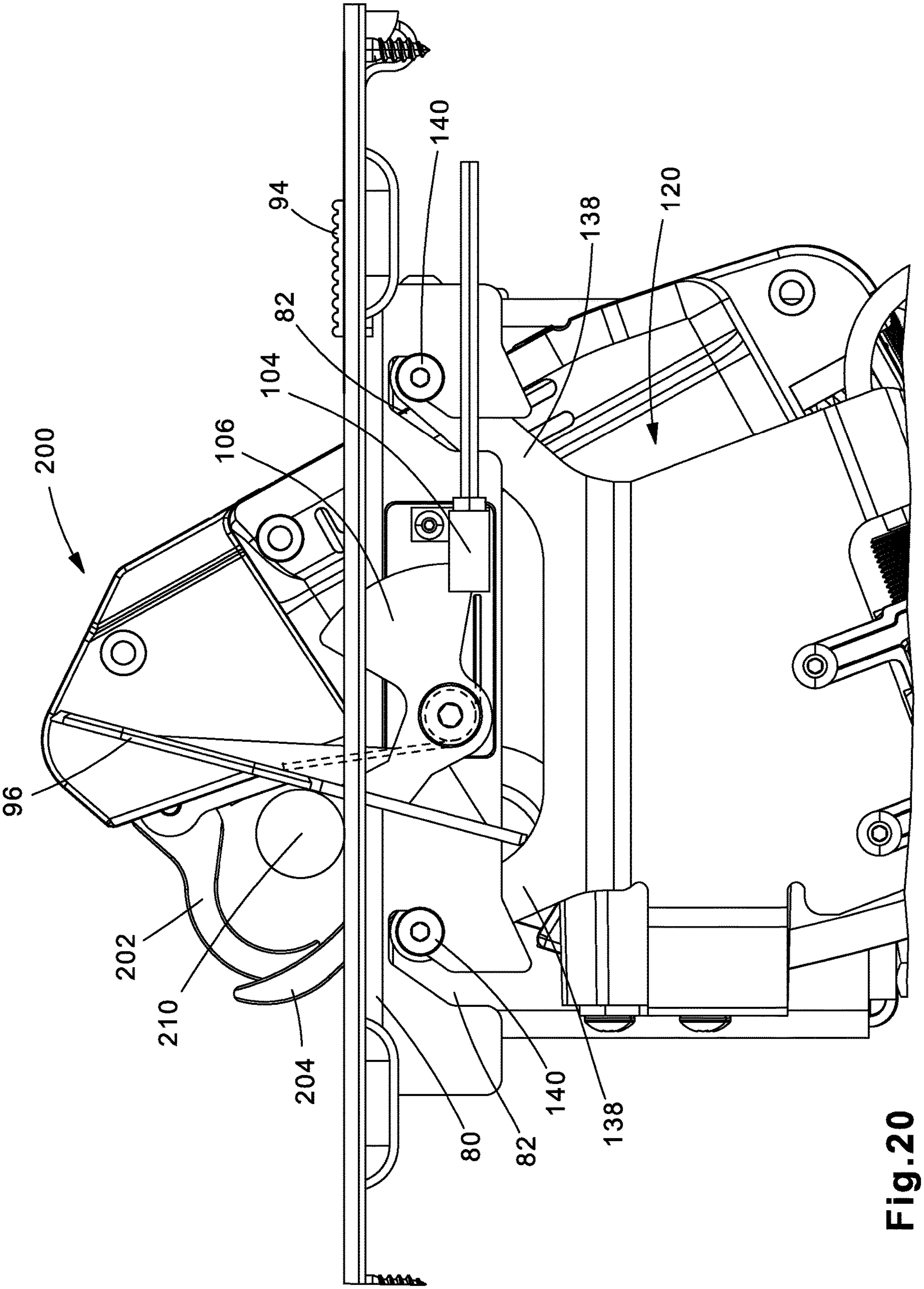
FIG. 20 is a side view of the flush mount tabletop fixture and automatic cable tie tool of FIG. 19, with a workpiece positioned within the tool.

FIGS. 17-18 illustrates a work piece 210 positioned under the upper jaw 202 of the automatic cable tie tool 200. As illustrated in FIGS. 19-20, the paddle 96 has been actuated and the lower jaw 204 and upper jaw 202 have closed around the work piece 210 to install the cable tie. As discussed above, the paddle 96 is actuated by either a hand or the work piece 210 engaging or pushing the paddle 96 backwards.

The hand paddle 96 and flush mount of the automatic cable tie tool 200 of the present invention provides an ergonomic improvement over prior bench mount tools with foot activation pedals.

Furthermore, while the preferred embodiments of the present invention have been shown and described, it will be obvious to those skilled in the art that changes, and modifications may be made without departing from the teaching of the invention. The matter set forth in the foregoing description and accompanying drawings is offered by way of illustration only and not as limitation. The actual scope of the invention is intended to be defined in the following claims when viewed in their proper perspective based on the prior art.

The invention claimed is:

1. A flush mount assembly for mounting an automatic cable tie tool to a work surface, the flush mount assembly comprising:

a work surface;

an overlay plate and an insert plate secured to the work surface;

a tool cage for holding the automatic cable tie tool, the tool cage is suspended from the insert plate for enabling a top of the automatic cable tie tool to protrude above the work surface;

a paddle assembly for activating the automatic cable tie tool, the paddle assembly is rotatably mounted to the insert plate; and wherein the insert plate has an opening and guide slots located at each side of the opening, the guide slots are accessible from the bottom of the insert plate for receiving the tool cage.

2. The flush mount assembly of claim 1, wherein the tool cage has a first side cage member with arms and a second side cage member with arms, guide bolts are located at the distal ends of the arms of the first side cage member and at the distal ends of the arms of the second side cage member.

3. The flush mount assembly of claim 2, wherein the insert plate has the opening and guide slots located at each side of the opening, wherein the guide slots receive the first side cage member and the second side cage member.

4. The flush mount assembly of claim 3, wherein the guide bolts extending from the arms of the first cage member and the guide bolts extending from the arms of the second cage member engage and travel along the guide slots for positioning the tool cage.

5. The flush mount assembly of claim 2, wherein the first side cage member and the second side cage member include front flanges; a front support block and a front handle support block are secured to the front flanges by fasteners; and a rear handle support block is secured to the front handle support block by fasteners, whereby the front support block, the front handle support block, and the rear handle support block retain the automatic cable tie tool in position in the tool cage.

6. The flush mount assembly of claim 1, wherein the paddle assembly having a paddle with a paddle latch;

a pair of mounting blocks mechanically fastened to the paddle, the mounting blocks are positioned within a slot on the insert plate;

an optical limit switch fastened to one of the mounting blocks;

a torsion spring; and a sensor blade for controlling an actuation of the paddle.

7. The flush mount assembly of claim 6, wherein when the paddle is horizontal the sensor blade disengages and the paddle is latched in a horizontal orientation by the paddle latch engaging a release slider positioned between the overlay plate and the insert plate, whereby sliding the release slider disengages the paddle latch enabling the paddle to return to a vertical position ready for operation.

8. The flush mount assembly of claim 1, wherein the overlay plate covers the insert plate.

9. The flush mount assembly of claim 8, wherein the overlay plate having a ruler label for measuring distances relative to the automatic cable tie tool installed in the tool cage.

10. The flush mount assembly of claim 8, further comprising a cover installed over openings within the overlay plate.

11. An automatic cable tie tool assembly flush mounted to a work surface, the automatic cable tie tool assembly comprising:

an automatic cable tie tool;

the work surface;

an overlay plate and an insert plate secured to the work surface;

a tool cage for holding the automatic cable tie tool, the tool cage is suspended from the insert plate for enabling a top of the automatic cable tie tool to protrude above the work surface; and a paddle assembly to activate the automatic cable tie tool, the paddle assembly is rotatably mounted to the insert plate.

12. The automatic cable tie tool assembly of claim 11, wherein the insert plate has an opening and guide slots located at each side of the opening, the guide slots are accessible from the bottom of the insert plate for receiving the tool cage.

13. The automatic cable tie tool assembly of claim 11, wherein the tool cage has a first side cage member with arms and a second side cage member with arms, guide bolts are located at the distal ends of the arms of the first side cage member and at the distal ends of the arms of the second side cage member.

14. The automatic cable tie tool assembly of claim 13, wherein the insert plate has an opening and guide slots located at each side of the opening, wherein the guide bolts extending from the arms of the first cage member and the guide bolts extending from the arms of the second cage member engage and travel along the guide slots for positioning the tool cage.

15. The automatic cable tie tool assembly of claim 13, wherein the first side cage member and the second side cage member include front flanges; a front support block and a front handle support block are secured to the front flanges by fasteners; and a rear handle support block is secured to the front handle support block by fasteners, whereby the front support block, the front handle support block, and the rear handle support block retain the automatic cable tie tool in position in the tool cage.

16. The automatic cable tie tool assembly of claim 11, wherein the paddle assembly having a paddle with a paddle latch;

a pair of mounting blocks mechanically fastened to the paddle, the mounting blocks are positioned within a slot on the insert plate;

an optical limit switch fastened to one of the mounting blocks;

a torsion spring; and a sensor blade for controlling an actuation of the paddle.

17. The automatic cable tie tool assembly of claim 16, wherein when the paddle is horizontal the sensor blade disengages and the paddle is latched in a horizontal orientation by the paddle latch engaging a release slider positioned between the overlay plate and the insert plate, whereby sliding the release slider disengages the paddle latch enabling the paddle to return to a vertical position ready for operation.

18. The automatic cable tie tool assembly of claim 11, wherein the overlay plate covers the insert plate.

19. A flush mount assembly for mounting an automatic cable tie tool to a work surface, the flush mount assembly comprising:

the work surface;

an overlay plate and an insert plate secured to the work surface;

a tool cage for holding the automatic cable tie tool, the tool cage is suspended from the insert plate for enabling a top of the automatic cable tie tool to protrude above the work surface;

a paddle assembly for activating the automatic cable tie tool, the paddle assembly is rotatably mounted to the insert plate; and a release slider for securing the paddle assembly in a retracted position flush with the work surface.

* * * * *